United States Patent
Alkan et al.

(10) Patent No.: US 11,981,813 B2
(45) Date of Patent: May 14, 2024

(54) POLYAMIDE MOLDING COMPOUNDS FOR HYPOCHLORITE-RESISTANT APPLICATIONS

(71) Applicant: EMS-CHEMIE AG, Domat/Ems (CH)

(72) Inventors: Arda Alkan, Domat/Ems (CH); Thomas Wiedemann, Domat/Ems (CH); Andri Cadalbert, Bonaduz (CH); Manfred Hewel, Domat/Ems (CH); Botho Hoffmann, Domat/Ems (CH)

(73) Assignee: EMS-Chemie AG, Domat/Ems (CH)

( * ) Notice: Subject to any disclaimer, the term of this patent is extended or adjusted under 35 U.S.C. 154(b) by 220 days.

(21) Appl. No.: 17/129,606

(22) Filed: Dec. 21, 2020

(65) Prior Publication Data

US 2021/0189124 A1    Jun. 24, 2021

(30) Foreign Application Priority Data

Dec. 23, 2019 (EP) .................................... 19219339

(51) Int. Cl.
    *C08L 77/06*     (2006.01)
    *C08G 69/26*     (2006.01)
    *C08K 7/14*     (2006.01)

(52) U.S. Cl.
    CPC ............ *C08L 77/06* (2013.01); *C08G 69/265* (2013.01); *C08K 7/14* (2013.01); *C08L 2205/03* (2013.01)

(58) Field of Classification Search
CPC .... C08L 2205/025; C08L 77/02; C08L 77/00; C08L 77/06
See application file for complete search history.

(56) References Cited

U.S. PATENT DOCUMENTS

| | | | |
|---|---|---|---|
| 5,177,177 A | 1/1993 | Thullen et al. | |
| 6,482,889 B1 | 11/2002 | Kurz | |
| 7,723,411 B2 | 5/2010 | Schneider | |
| 7,973,191 B2 | 7/2011 | Doring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,586,662 B2 | 11/2013 | Harder et al. | |
| 8,604,120 B2 | 12/2013 | Stöppelmann et al. | |
| 8,993,662 B2 | 3/2015 | Kaplan | |
| 9,109,115 B2 | 8/2015 | Buhler et al. | |
| 9,133,322 B2 | 9/2015 | Roth et al. | |
| 9,267,036 B2 * | 2/2016 | Pfleghar ................... C08K 3/30 |
| 9,359,532 B2 | 6/2016 | Kaplan | |
| 9,453,106 B2 | 9/2016 | Buhler et al. | |
| 9,644,081 B2 | 5/2017 | Aepli et al. | |
| 9,663,655 B2 | 5/2017 | Aepli | |
| 9,815,967 B2 | 11/2017 | Harder et al. | |
| 9,963,547 B2 | 5/2018 | Hoppe et al. | |
| 9,963,591 B2 | 5/2018 | Bayer et al. | |
| 9,969,882 B2 | 5/2018 | Thomas et al. | |
| 10,005,268 B2 | 6/2018 | Jeltsch et al. | |
| 10,047,054 B2 | 8/2018 | Kaplan | |
| 10,144,805 B2 | 12/2018 | Bayer et al. | |
| 10,233,326 B2 | 3/2019 | Koch et al. | |
| 10,544,286 B2 | 1/2020 | Nakano et al. | |
| 10,577,478 B2 | 3/2020 | Fujii et al. | |
| 10,683,418 B2 | 6/2020 | Thomas et al. | |
| 10,717,816 B2 | 7/2020 | Aepli et al. | |
| 10,751,961 B2 | 8/2020 | Cheung | |
| 10,767,047 B2 | 9/2020 | Aepli et al. | |
| 10,767,048 B2 | 9/2020 | Aepli et al. | |
| 10,836,905 B2 | 11/2020 | Wiedemann et al. | |
| 10,843,389 B2 | 11/2020 | Weis et al. | |
| 10,882,975 B2 | 1/2021 | Stöppelmann | |
| 10,889,713 B2 | 1/2021 | Schubert et al. | |
| 10,899,527 B2 | 1/2021 | Sütterlin et al. | |
| 11,274,204 B2 * | 3/2022 | Wiedemann ......... C08G 69/265 |
| 11,359,091 B2 * | 6/2022 | Wiedemann ............ C08L 77/06 |
| 11,466,153 B2 * | 10/2022 | Wiedemann ............ C08L 77/06 |
| 2006/0235190 A1 | 10/2006 | Hoffman et al. | |
| 2006/0264542 A1 | 11/2006 | Schneider | |
| 2008/0135720 A1 | 6/2008 | Bühler et al. | |
| 2008/0300347 A1 | 12/2008 | Kurz et al. | |
| 2010/0069657 A1 | 3/2010 | Doring et al. | |
| 2010/0168423 A1 | 7/2010 | Doring et al. | |
| 2010/0249307 A1 * | 9/2010 | Stoppelmann ......... C08L 77/02 524/451 |
| 2010/0279111 A1 | 11/2010 | Harder et al. | |
| 2011/0220667 A1 | 9/2011 | Pfleghar et al. | |

(Continued)

FOREIGN PATENT DOCUMENTS

| | | |
|---|---|---|
| EP | 0 469 435 A1 | 2/1992 |
| EP | 1 291 073 A1 | 3/2003 |

(Continued)

OTHER PUBLICATIONS

US 10,875,999 B2, 12/2020, Stöppelmann et al. (withdrawn)
Schlosser, "Binding kinetics of water disinfection by-products," Dissertation, Heidelberg University, 2018, pp. 36-37.
U.S. Appl. No. 09/533,280, filed Mar. 22, 2000.
U.S. Appl. No. 10/536,494, filed May 24, 2005.
U.S. Appl. No. 10/553,259, filed Oct. 11, 2005.

(Continued)

*Primary Examiner* — Ana L. Woodward

(74) *Attorney, Agent, or Firm* — Leydig, Voit & Mayer, Ltd.

(57) ABSTRACT

The present invention relates to the use of a polyamide molding compound for application purposes in which high resistance to hypochlorous acid is crucial. The molding compound is thus used according to the invention for molded bodies suitable for being in contact with aqueous; hypochlorous acid-containing solutions.

13 Claims, No Drawings

(56) References Cited

U.S. PATENT DOCUMENTS

| | | |
|---|---|---|
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0136911 A1 | 5/2013 | Bender et al. |
| 2013/0317168 A1 | 11/2013 | Buhler et al. |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0179866 A1* | 6/2014 | Pfleghar .............. C08K 3/013 524/607 |
| 2014/0272227 A1 | 9/2014 | Jeltsch et al. |
| 2014/0275392 A1 | 9/2014 | Buhler et al. |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251600 A1 | 9/2018 | Hoffman et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Cavieze |
| 2021/0032465 A1* | 2/2021 | Wiedemann .............. C08L 77/02 |

FOREIGN PATENT DOCUMENTS

| | | |
|---|---|---|
| EP | 3 369 761 A1 | 9/2018 |
| EP | 3 502 188 A1 | 6/2019 |
| WO | WO 2019/121038 A1 * | 6/2019 |

OTHER PUBLICATIONS

U.S. Appl. No. 11/950,964, filed Dec. 5, 2007.
U.S. Appl. No. 12/091,024, filed Apr. 21, 2008.
U.S. Appl. No. 12/539,972, filed Aug. 12, 2009.
U.S. Appl. No. 12/540,007, filed Aug. 12, 2009.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/290,718, filed Nov. 7, 2011.
U.S. Appl. No. 13/421,541, filed Mar. 15, 2012.
U.S. Appl. No. 13/481,451, filed May 25, 2012.
U.S. Appl. No. 13/674,395, filed Nov. 12, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/078,134, filed Nov. 12, 2013.
U.S. Appl. No. 14/204,404, filed Mar. 11, 2014.
U.S. Appl. No. 14/205,667, filed Mar. 12, 2014.
U.S. Appl. No. 14/221,930, filed Mar. 21, 2014.
U.S. Appl. No. 14/397,529, filed Oct. 28, 2014.
U.S. Appl. No. 14/397,534, filed Oct. 28, 2014.
U.S. Appl. No. 14/504,651, filed Oct. 2, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,891, filed Mar. 2, 2018.
U.S. Appl. No. 15/955,737, filed Apr. 18, 2018.
U.S. Appl. No. 16/094,198, filed Oct. 16, 2018.
U.S. Appl. No. 16/104,028, filed Aug. 16, 2018.
U.S. Appl. No. 16/104,035, filed Aug. 16, 2018.
U.S. Appl. No. 16/104,043, filed Aug. 16, 2018.
U.S. Appl. No. 16/115,055, filed Aug. 28, 2018.
U.S. Appl. No. 16/515,119, filed Jul. 18, 2019.
U.S. Appl. No. 16/515,151, filed Jul. 18, 2019.
U.S. Appl. No. 16/595,559, filed Oct. 8, 2019.
U.S. Appl. No. 16/717,369, filed Dec. 17, 2019.
U.S. Appl. No. 16/956,564, filed Jun. 20, 2020.
U.S. Appl. No. 16/956,576, filed Jun. 20, 2020.
U.S. Appl. No. 16/956,579, filed Jun. 20, 2020.
U.S. Appl. No. 16/956,580, filed Jun. 20, 2020.
U.S. Appl. No. 16/987,913, filed Aug. 7, 2020.
U.S. Appl. No. 16/988,011, filed Aug. 7, 2020.
U.S. Appl. No. 17/129,507, filed Dec. 21, 2020.

* cited by examiner

POLYAMIDE MOLDING COMPOUNDS FOR HYPOCHLORITE-RESISTANT APPLICATIONS

CROSS-REFERENCE TO A RELATED APPLICATION

This patent application claims the benefit of European Patent Application No. EP 19 219 339.9, filed on Dec. 23, 2019, the disclosure of which is incorporated herein by reference in its entirety for all purposes.

BACKGROUND OF THE INVENTION

The present invention relates to the use of a polyamide molding compound for application purposes in which high resistance to hypochlorous acid is crucial. The molding compound is thus used according to the invention for molded bodies suitable for being in contact with aqueous, hypochlorous acid-containing solutions.

EP 1 291 073 A1 relates to polyamide microcapsules that are obtained by contacting aqueous phases, containing diamines and anionic polymers and/or heteropolysaccharides in dissolved form, with oil phases, containing dissolved dicarboxylic acid halides, forming a W/O emulsion, hardening with a calcium salt solution, and filtering, washing, and drying. Polyamide microcapsules are described as being stable with respect to hypochlorite lye and are used for cosmetic purposes.

EP 3 502 188 A1 relates to a polyamide molding compound, in particular for use in the drinking water area, that is, for producing molded parts in which, when used as intended, the processed molding compound comes in contact with drinking water. Resistance to hypochlorite, however, is not mentioned, nor is a use of the polyamide molding compound for molded bodies that come in contact with hypochlorite-containing solutions, when used as intended.

Copolyamides, which are suitable for producing molded bodies having a high glass transition temperature, rigidity and impact resistance, and low moisture absorption, are known from EP 0 469 435 A1. In addition, a method for producing these copolyamides and the use thereof for producing molded bodies are disclosed.

Proceeding from this, it was the object of the present invention to find suitable polyamide molding compounds that allow a use in which the compound is exposed to hypochlorite-containing solutions during use. In the process, the use is intended to allow enhanced stability with respect to the applications known from the prior art. Enhanced stability here shall mean a change in weight that is as low as possible when the molding compounds according to the invention are stored in hypochlorite-containing solutions. Moreover, the molding compounds according to the invention are characterized by enhanced stability in terms of mechanics, in particular the tensile force.

This object is achieved by the features of the invention described herein, and the advantageous refinements thereof.

Definitions of Terms

Designations and Abbreviations for Polyamides and the Monomers Thereof

Within the meaning of the present invention, the term "polyamide" (abbreviation: PA) shall be understood to mean a generic term that encompasses homopolyamides and copolyamides. The selected designations and abbreviations for polyamides and the monomers thereof correspond to those established in ISO standard 1874-1 (2011, (D)). The abbreviations used therein are used hereafter synonymously for the IUPAC names of the monomers. In particular, the following abbreviations appear for monomers in the present application: MACM for bis(4-amino-3-methylcyclohexyl)methane (also referred to as 3,3'-dimethyl-4,4'-diaminodicyclohexylmethane, CAS No. 6864-37-5), TMDC for bis(4-amino-3,5-dimethylcyclohexyl)methane (also referred to as 3,3',5,5'-tetramethyl-4,4'-diaminodicyclohexylmethane, CAS No. 65962-45-0), PACM for bis(4-aminocyclohexyl)methane (also referred to as 4,4'-dianinodicyclohexylmethane, CAS No. 1761-71-3), BAC for 1,3-bis(aminomethyl)cyclohexane (also referred to as 1,3-cyclohexanedimethanamine, CAS-No. 2579-20-6) and for 1,4-bis(aminomethyl)cyclohexane (also referred to as 1,4-cyclohexanedimethanamine, CAS No. 2549-93-1) and for the mixtures thereof, IPD for isophorone diamine (also referred to as 3-(aminomethyl)-3,5,5-trimethylcyclohexanamine, 1-amino-3-aminomethyl-3,5,5-trimethylcyclohexane or cyclohexanemethanamine, 5-amino-1,3,5,5-trimethyl, CAS No. 2855-13-2), T for terephthalic acid (CAS No. 100-21-0), I for isophthalic acid (CAS No. 121-95-5), 36 for dimeric fatty acid having 36 carbon atoms (CAS No. 68783-41-5 or 61788-89-4), 12 for dodecanedioic acid (also referred to as 1,10-decanedicarboxylic acid, CAS No. 693-23-2), CHD for 1,4-cyclohexanedicarboxylic acid (CAS No. 1076-97-7), 12 for Lactam-12 (also referred to as laurin lactam, CAS No. 947-04-6).

Amorphous or Microcrystalline Polyamides

Amorphous or microcrystalline polyamides, in differential scanning calorimetry (DSC) according to ISO 11357-2 (2013), at a heating rate of 20 K/min, preferably show a heat of fusion of no more than 28 J/g, particularly preferably of no more than 25 J/g, and most particularly preferably 0 to 23 J/g.

Microcrystalline polyamides are semi-crystalline polyamides and thus have a melting point. However, their morphology is such that the crystallites have such a small dimension that a plate having a thickness of 2 mm produced thereof is still transparent, that is, the light transmission thereof is at least 80%, preferably at least 85%, and particularly preferably at least 90%, measured according to ASTM D 1003-13 (2013).

The microcrystalline polyamides used for the polyamide molding compounds according to the invention preferably have a melting temperature, measured according to ISO 11357-3 (2013), of no more than 255° C.

Amorphous polyamides have lower heat of fusion, compared to the microcrystalline polyamides. Amorphous microcrystalline polyamides, in differential scanning calorimetry (DSC) according to ISO 11357-2 (2013), at a heating rate of 20 K/min, preferably show a heat of fusion of no more than 5 J/g, particularly preferably of no more than 3 J/g, and most particularly preferably 0 to 1 J/g.

Amorphous polyamides have no melting temperature due to the amorphicity thereof.

Amorphous polyamides are transparent, that is, the light transmission thereof is at least 80%, preferably at least 85%, and particularly preferably at least 90%, measured on 2 mm thick plates according to ASTM D 1003-13 (2013).

Semi-Crystalline Polyamides

Within the meaning of the present invention, semi-crystalline polyamides are polyamides that, in differential scanning calorimetry (DSC) according to ISO 11357-2 (2013), at a heating rate of 20 K/min, preferably have a heat of fusion of at least 30 J/g, particularly preferably of at least 35 J/g, and most particularly preferably of at least 40 J/g. A plate having a thickness of 2 mm, made of semi-crystalline polyamides, is not transparent, that is, the light transmission thereof is less than 80%, preferably less than 70%, and particularly preferably less than 60%, measured according to ASTM D 1003-13 (2013).

Semi-crystalline polyamides have a melting temperature.

Dimeric Fatty Acid

Within the meaning of the present invention, dimeric fatty acids have at least 28 carbon atoms (C atoms). These are obtained by dimerization of unsaturated monocarboxylic acids to dicarboxylic acids, wherein the dimerization is preferably carried out catalytically. Dimeric fatty acids according to the present invention are dicarboxylic acids. The dimeric fatty acids is are preferably partially saturated, and particularly preferably these are fully saturated.

Quantity Information of the Monomers

If the polyamides (A) or (B) only comprise diacids and diamines, the molar fractions thereof add up to 50 mol % for the sum of all diamines, and 50 mol % for the sum of all diacids, and the sum of the diamine and diacid fractions adds up to 100 mol % for the polyamide.

If the polyamides (A) or (B), in addition to diacids and diamines, also comprise lactams or W-amino acids at x mol %, the sum of all diamines is only (50-0.5×) mol %, and the sum of all diacids is only (50-0.5×) mol %, based on 100 mol % polyamide.

With respect to the quantity information regarding the diacids and diamines of the polyamides, it always applies that the sum of the molar fractions of all diamines is equal to the sum of the molar fractions of all diacids.

General Information Regarding Quantity Information

The molding compounds according to the present invention preferably comprise the components (A), (B) and, optionally, (C) and/or (D) and/or (E), in the process the proviso applying that components (A), (B) and, optionally, (C) and/or (D) and/or (E) in sum add up to 100 wt. %. The established ranges of the quantity information for the individual components (A), (B), (C), (D) and (E) shall be understood such that, within the predefined ranges, an arbitrary amount can be selected for each of the individual components, provided the strict proviso is met that the sum of the components (A), (B), and optionally (C) and/or (D) and/or (E) is 100 wt. %.

Hypochlorous Acid, Hypochlorite

Within the meaning of the present invention, both terms are used synonymously with respect to aqueous solutions or resistance, since in aqueous solutions there is an equilibrium between the two species.

This equilibrium between hypochlorous acid and hypochlorite is pH-dependent (see Bildungskinetik von Wasserdesinfektionsnebenprodukten (Formation kinetics of water disinfection by-products)—Dissertation by Tim Schlosser, Heidelberg 2018, pages 36-37) and, at a pH of 6.8, is on the hypochlorous acid side. From the Hagg diagram for the pH range of 6.5≤pH≥7.8 relevant according to DIN 19643 (Treatment of water of swimming pools and baths) (loc cit, FIG. 2.5, page 37), a composition of approximately 80% hypochlorous acid and approximately 20% hypochlorite can be derived for a pH of 6.8.

Hypochlorite-Containing Solutions

Within the meaning of the present invention, the term "hypochlorite-containing solutions" encompasses solutions of hypochlorite ions (for example, a solution of sodium hypochlorite or hypochlorous acid) in water, and thus a mixture of hypochlorous acid and hypochlorite, wherein the concentration ratio thereof is pH-dependent.

Hypochlorite Storage

Within the meaning of the present invention, the term "hypochlorite storage" encompasses the storage of test specimens (tensile bars) in a solution of hypochlorite ions (for example, a solution of sodium hypochlorite or hypochlorous acid) in water, and thus a mixture of hypochlorous acid and hypochlorite, wherein the concentration ratio thereof is pH-dependent.

The present invention thus relates to the use of a polyamide molding compound, comprising or consisting of:
  at least one semi-crystalline polyamide (A); and
  at least one amorphous or microcrystalline polyamide (B)
  for producing molded bodies that are resistant to aqueous solutions comprising hypochlorous acid and/or the salts thereof.

Resistant shall mean a change in weight of the stored molded body after 8064 hours of storage, measured as described herein, of no more than 12%, preferably of no more than 11%, and particularly preferably of no more than 10%,
  and/or
  a tensile force of the stored molded body after 8064 hours of storage, measured as described under "Measuring Methods", of at least 70%, preferably at least 73%, and is particularly preferably at least 75% of the value of the tensile force of the non-stored test specimen.

Surprisingly, during the search for suitable polyamides that are able to achieve the above-described object, it was found that the polyamide molding compounds described herein have high resistance to hypochlorite-containing solutions, and are thus suitable for the purposes according to the invention.

The use according to the invention thus preferably makes it possible to produce molded bodies that are resistant to aqueous solutions comprising hypochlorous acid and/or the salts thereof.

A preferred embodiment of the use according to the invention provides the use for producing a molded body, selected from the group consisting of components for the delivery and/or storage of drinking water or warm water, components in swimming pools, whirlpools, heating systems or in the sanitary field (kitchen, bath, sauna, toilet), faucets, fittings, housings, mixers, taps, filter housings, water meters, water meter components (bearing, screw, pedestal), valves, valve components (housing, shut-off ball, gate, cylinder), distributors, cartridges, pumps, pump components (impellers), viewing glasses, covers, lines or receptacles, as well as components or elements thereof.

With respect to the use according to the invention, it may be provided that the polyamide molding compound at least additionally comprises at least one inorganic filler (C) and/ or, optionally, at least one additive (D), and/or, optionally, at least one further polymer (E) different from polyamide (A), polyamide (B) and different from the additive (D).

In a particularly preferred embodiment of the use according to the invention, the polyamide molding compound has the following composition:

19 to 95 wt. %, preferably 25 to 89.39 wt. %, particularly preferably 21 to 67.9 wt. % of at least one semi-crystalline polyamide (A); to 60 wt. %, preferably 10 to 50 wt. %, particularly preferably 15 to 30 wt. % of at least one amorphous or microcrystalline polyamide (B);

0 to 70 wt. %, preferably 0.1 to 60 wt. %, particularly preferably 15 to 50 wt. % of at least one inorganic filler (C);

0 to 6 wt. %, preferably 0.01 to 5 wt. %, and particularly preferably 0.1 to 4 wt. % of at least one additive (D); as well as 0 to 20 wt. %, preferably 0.5 to 15 wt. %, and particularly preferably 2 to 10 wt. % of at least one polymer (E), components (A) to (E) adding up to 100 wt. %.

In a further use according to the invention, it may be provided that the polyamide molding compound at least additionally comprises at least one inorganic filler (C) and/or, optionally, at least one additive (D).

In a further particularly preferred embodiment of the use according to the invention, the polyamide molding compound has the following composition:

19 to 95 wt. %, preferably 25 to 89.89 wt. %, particularly preferably 31 to 69.9 wt. % of at least one semi-crystalline polyamide (A);

5 to 60 wt. %, preferably 10 to 50 wt. %, particularly preferably 15 to 30 wt. % of at least one amorphous or microcrystalline polyamide (B);

0 to 70 wt. %, preferably 0.1 to 60 wt. %, particularly preferably 15 to 50 wt. % of at least one inorganic filler (C); as well as 0 to 6 wt. %, preferably 0.01 to 5 wt. %, particularly preferably 0.1 to 4 wt. % of at least one additive (D), components (A) to (D) adding up to 100 wt. %.

Components (A) to (E) are described in more detail hereafter.

Component (A)

According to a preferred embodiment of the present invention, the at least one semi-crystalline polyamide (A)

has a melting temperature, measured according to ISO 11537-3 (2013), of 120 to 350° C., preferably 175 to 330° C., particularly preferably of 280 to 325° C., and/or heat of fusion, measured according to ISO 11537-3 (2013), of at least 30 J/g, particularly preferably of at least 35 J/g, most particularly preferably of at least 40 J/g, and/or light transmission, measured on a plate having a thickness of 2 mm according to ASTM D 1003-13 (2013), of less than 80%, preferably less than 70%, particularly preferably less than 60%.

According to a further preferred embodiment of the present invention, the at least one semi-crystalline polyamide (A) is formed from the monomers (a1) to (a2), and optionally (a3):

(a1) at least one diamine, selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-methyl-1,5-pentanediamine, 2-methyl-1,8-octanediamine, bis(4-amino-cyclohexyl)methane, bis(aminomethyl)cyclohexane, isophoronediamine, and m-xylylenediamine; and (a2) at least one dicarboxylic acid, selected from the group consisting of 1,6-hexanedioic acid, 1,9-nonanedioic acid, 1,10-decanedioic acid, 1,12-dodecanedioic acid, 1,13-tridecandioic acid, 1,14-tetradecanedioic acid, 1,15-pentadecanoic acid, 1,16-hexadecanedioic acid, 1,17-heptadecanedioic acid, 1,18-octadecanedioic acid, cyclohexanedicarboxylic acid, dimeric fatty acid having 36 or 44 C atoms, isophthalic acid, and terephthalic acid, and/or (a3) one or more lactams or w-amino acids, selected from the group consisting of lactam-6, lactam-11, lactam-12, 1,6-aminohexanoic acid, 1,11-aminoundecanoic acid, and 1,12-aminododecanoic acid.

According to a particularly preferred embodiment of the present invention, the at least one semi-crystalline polyamide (A) is selected from the group consisting of:

PA 6, PA 46, PA 49, PA 410, PA 411, PA 412, PA 413, PA 414, PA 415, PA 416, PA 417, PA 418, PA 436, PA 56, PA 510, PA 66, PA 69, PA 610, PA 611, PA 612, PA 613, PA 614, PA 615, PA 616, PA 617, PA 618, PA 1010, PA 66/6, PA 6/66/610, PA 6/66/12, PA 6/12, PA 11, PA 12, PA 912, PA 1212, PA MXD6, PA MXD9, PA MXD10, PA MXD11, PA MXD12, PA MXD13, PA MXD14, PA MXD15, PA MXD16, PA MXD17, PA MXD18, PA MXD36, PA MXD6/MXDI, polyamides having a 4T repeating unit, polyamides having a 5T repeating unit, polyamides having a 6T repeating unit, polyamides having an 8T repeating unit, polyamides having a 9T repeating unit, polyamides having a 10T repeating unit, polyamides having a 12T repeating unit, PA 4T/6T, PA 4T/8T, PA 6T/8T, PA 4T/MPMDT, PA 4T/41, PA 5T/51, PA 6T/6I, PA 9T/MODT, PA 9T/91, PA 1T, PA 10T/6T, PA 10T/6T/10I/6I, PA 12T, PA MPMDT/6T, PA 10T/10I, PA 12T/12I, PA 4T/6T/8T, PA 4T/6T/10T, PA 4T/8T/10T, PA6T/8T/10T, PA 4T/6T/MPMDT, PA 6T/6, PA 6T/66, PA 4T/66, PA 5T/66, PA 6T/6I/6, PA 10T/6T/1012/612, PA 6T/BACT, PA 6I/6T/BACI/BACT, PA 66/BAC6/MACM6, PA 66/BAC6/PACM6, PA 66/BAC6/IPD6, and the mixtures or copolymers thereof, preferably PA 6, PA 66, PA 69, PA 610, PA 612, PA 616, PA 1010, PA 66/6, PA 6/12, PA 11, PA 12, PA 1212, PA MXD6, PA MXD10, PA 6T/6I, PA 9T/MODT, PA 10T, PA 10T/6T, PA 10T/6T/10I/6I, PA 12T, PA 10T/10I, PA 6T/6, PA 6T/66, PA 10T/6T/1012/612, PA 6T/BACT, PA 6I/6T/BACI/BACT, PA 66/BAC6/MACM6, PA 66/BAC6/PACM6, PA 66/BAC6/IPD6, particularly preferably PA 6, PA 66, PA 610, PA 612, PA 616, PA 1010, PA 66/6, PA 6/12, PA 12, PA 6T/6I, PA 10T, PA 10T/6T, PA 10T/6T/10I/6I, PA 10T/10I, PA 6T/6, PA 6T/66, PA 6T/6I/6, PA 10T/6T/1012/612, PA 6T/BACT, PA 6I/6T/BACI/BACT, PA 66/BAC6/MACM6.

The relative viscosity of the semi-crystalline polyamide (A), determined on solutions of 0.5 g polyamide in 100 ml m-cresol according to ISO 307 (2013) at 20° C., is preferably 1.40 to 2.50, particularly preferably 1.45 to 2.30, and most particularly preferably 1.60 to 2.15.

Component (B)

According to a preferred embodiment of the present invention, the at least one amorphous or semi-crystalline polyamide (B)
- has heat of fusion, measured according to ISO 11537-3 (2013), of no more than 28 J/g, particularly preferably of no more than 25 J/g, most particularly preferably of no more than 0 to 23 J/g, and/or
- light transmission, measured on a plate having a thickness of 2 mm according to ASTM D 1003-13 (2013), of at least 80%, preferably of at least 85%, particularly preferably of at least 90%; and/or
- a glass transition temperature, measured according to ISO 11537-2 (2013), of 60 to 240° C., preferably 80 to 230° C., particularly preferably of 105 to 210° C.

According to a further preferred embodiment of the present invention, the at least one amorphous or microcrystalline polyamide (B) is formed from the monomers (b1) to (b2), and optionally (b3):
- (b1) at least one diamine, selected from the group consisting of 1,6-hexanediamine, 1,10-decanediamine, 1,12-dodecanediamine, 2-methyl-1,5-pentanediamine, m-xylylenediamine, bis(4-amino-3-methylcyclohexyl)methane, bis(4-aminocyclohexyl)methane, bis(4-amino-3,5-dimethylcyclohexyl)methane, bis(aminomethyl)cyclohexane ND for 2,2,4-trimethylhexamethylenediamine, and IND for 2,4,4-trimethylhexamethylenediamin; and
- (b2) at least one dicarboxylic acid, selected from the group consisting of 1,6-hexanedioic acid, 1,10-decanedioic acid, 1,12-dodecanedioic acid, 1,14-tetradecanedioic acid, 1,16-hexadecanedioic acid, 1,18-octadecanedioic acid, dimeric fatty acid having 36 or 44 C atoms, cyclohexanedicarboxylic acid, isophthalic acid, terephthalic acid, and naphthalenedicarboxylic acid; and/or
- (b3) one or more lactams or ω-amino acids, selected from the group consisting of lactam-6, lactam-11, lactam-12, 1,6-aminohexanoic acid, 1,11-aminoundecanoic acid, and 1,12-aminododecanoic acid.

According to a particularly preferred embodiment of the present invention, the at least one amorphous or microcrystalline polyamide (B) is selected from the group consisting of:
PA 6I, PA 6I/6T, PA 10I/10T, PA MPMDI/MPMDT, PA 6I/6T/6N, PA MXDI/6I, PA MXDI/MXDT/6I/6T, PA MXDI/12I, PA MXDI, PA MXDI/MXD6, PA MACM10, PA MACM12, PA MACM14, PA MACM16, PA MACM18, PA NDT/INDT, PA TMDC10, PA TMDC12, PA TMDC14, PA TMDC16, PA TMDC18, PA PACM12, PA PACM14, PA PACM16, PA PACM18, PA PACM10/11, PA PACM10/12, PA PACM12/612, PA PACM12/PACM14/612/614, PA MACMI/12, PA MACMT/12, PA MACMI/MACM12, PA MACMI/MACMN, PA MACMT/MACM12, PA MACMT/MACMN, PA MACM36, PATMDC36, PA MACMI/MACM36, PA 6I/MACMI/12, PA MACMT/MACM36, PA MACMI/MACMT/MACM36, PA MACMI/MACMT/12, PA 6I/6T/MACMI/MACMT, PA 6I/6T/MACMI/MACMT/12, PA MACM6/11, PA MACM6/12, PA MACMI/11, PA MACM10/12, PA MACM10/1010, PA MACM12/1012, PA MACM12/1212, PA MACM14/1014, PA MACM14/1214, PA MACM16/1016, PA MACM18/1018, PA 6I/6T/MACMI/MACMT/MACM12/612, PA 6I/6T/MACMI/MACMT/MACM12, PA MACMI/MACMT/MACM12/12, PA MACMI/MACMT/MACM12, PA 6I/6T/MACMI/MACMT/12, PA 6I/6T/6N/MACMI/MACMT/MACMN, PA TMDC12/TMDCT/TMDC36, PA TMDC12/TMDCI, PA TMDC12/TMDCI/TMDC36, PA TMDC12/TMDCT, PA 6I/6T/BACI/BACT, PA MACMI/MACMT/BACI/BACT, PA 6I/6T/MACMI/MACMT/BACI/BACT, PA MACMI/MACMT/MACM12/MACM36, PA MACMI/MACMT/MACM14/MACM36, PA MACMI/MACMT/MACMCHD/MACM36, PA TMDCI/TMDCT/TMDC12/TMDC36, PA TMDCI/TMDCT/TMDC14/TMDC36, PA TMDCI/TMDCT/TMDCCHD/TMDC36, and mixtures or copolymers thereof,
wherein MACM can be replaced with PACM and/or TMDC up to a maximum of 35 mol %, based on the sum of the molar fractions of all monomers of 100 mol %, and/or
laurin lactam can be replaced entirely or partially with caprolactam, and/or
the dimeric fatty acid having 36 carbon atoms can be replaced entirely or partially with a dimeric fatty acid having 44 carbon atoms, preferably
PA 6I/6T, PA 10I/10T, PA MPMDI/MPMDT, PA MXDI/6I, PA MXDI/MXDT/6I/6T, PA MACM10, PA MACM12, PA MACM14, PA MACM16, PA MACM18, PA NDT/INDT, PA TMDC10, PA TMDC12, PA TMDC14, PA TMDC16, PA TMDC18, PA PACM12, PA PACM14, PA PACM16, PA PACM18, PA PACM10/11, PA PACM10/12, PA PACM12/612, PA PACM12/PACM14/612/614, PA MACMI/12, PA MACMT/12, PA MACMI/MACM12, PA 6I/MACMI/12, PA MACMI/MACMT/12, PA 6I/6T/MACMI/MACMT, PA 6I/6T/MACMI/MACMT/12, PA MACM10/1010, PA MACM14/1014, PA 6I/6T/MACMI/MACMT/MACM12/612, PA MACMI/MACMT/MACM12, PA 6I/6T/MACMI/MACMT/12, PA TMDC12/TMDCI, PA TMDC12/TMDCI/TMDC36, PA 6I/6T/BACI/BACT, PA 6I/6T/MACMI/MACMT/BACI/BACT, PA MACMI/MACMT/MACM12/MACM36, PA MACMI/MACMT/MACM14/MACM36, PA MACMI/MACMT/MACMCHD/MACM36, PA TMDCI/TMDCT/TMDC12/TMDC36, PA TMDCI/TMDCT/TMDC14/TMDC36, PA TMDCI/TMDCT/TMDCCHD/TMDC36, and mixtures or copolymers thereof,
wherein MACM can be replaced with PACM and/or TMDC up to a maximum of 35 mol %, based on the sum of the molar fractions of all monomers of 100 mol %, and/or
laurin lactam can be replaced entirely or partially with caprolactam, and/or
the dimeric fatty acid having 36 carbon atoms can be replaced entirely or partially with a dimeric fatty acid having 44 carbon atoms,
particularly preferably
PA 6I/6T, PA 10I/10T, PA MXDI/6I, PA MACM10, PA MACM12, PA MACM14, PA MACM16, PA MACM18, PA TMDC10, PA TMDC12, PA TMDC14, PA TMDC16, PA TMDC18, PA PACM12, PA PACM14, PA PACM16, PA PACM18, PA PACM10/11, PA PACM10/12, PA PACM12/612, PA PACM12/PACM14/612/614, PA MACMI/12, PA MACMT/12, PA MACMI/MACM12, PA 6I/MACMI/12, PA MACMI/MACMT/12, PA 6I/6T/MACMI/MACMT/MACM12/612, PA MACMI/MACMT/MACM12, PA 6I/6T/MACMI/MACMT/12, PA TMDC12/TMDCI, PA TMDC12/TMDCI/TMDC36, PA MACMI/ MACMT/MACM12/MACM36, PA MACMI/ MACMT/MACM14/MACM36, PA TMDCI/TMDCT/ TMDC12/TMDC36, PA TMDCI/TMDCT/TMDC14/ TMDC36, and mixtures or copolymers thereof, wherein MACM can be replaced with PACM and/or TMDC up to a maximum of 35 mol %, based on the sum of the molar fractions of all monomers of 100 mol %, and/or laurin lactam can be replaced entirely or partially with caprolactam, and/or the dimeric fatty acid having 36 carbon atoms can be replaced entirely or partially with a dimeric fatty acid having 44 carbon atoms.

In the amorphous polyamides PA 6I/6T, PA 10I/10 T, the content of isophthalic acid is preferably 53 to 90 mol %, and particularly preferably up to 55 to 80 mol %. It is most particularly preferred for the mol ratio of isophthalic acid to terephthalic acid to be 65:35 to 70:30.

The content of 1,6-hexanediamine in the amorphous PA MXDI/6I is preferably 15 to 40 mol %, and particularly preferably 20 to 35 mol %, wherein the sum of the molar fractions of all monomers is 100 mol %. In particular, it is preferred for the PA MXDI/6I to have the mol ratio 46/54.

The content of 1,6-hexanediamine in the PA PACM12/ 612 is preferably 2 to 24 mol %, and particularly preferably 6 to 15 mol %, wherein the sum of the molar fractions of all monomers is 100 mol %. The polyamides PA PACM12/612 comprising a maximum of 24 mol % 1,6-hexanediamine are microcrystalline.

The content of 1,6-hexanediamine in the PA PACM12/ PACM14/612/614 is preferably 2 to 24 mol %, and particularly preferably 6 to 15 mol %, and/or the content of 1,14-tetradecanedioic acid is 2 to 24 mol %, and preferably 6 to 15 mol %, wherein the sum of the molar fractions of all monomers is 100 mol %. The polyamides PA PACM12/ PACM14/612/614 comprising a maximum of 24 mol % 1,6-hexanediamine are microcrystalline.

The content of laurin lactam in the amorphous PA MACMI/12 is preferably 15 to 50 mol %, particularly preferably 20 to 40 mol %, and most particularly preferred 19 mol % or 35 mol %, wherein the sum of the molar fractions of all monomers is 100 mol %.

In the amorphous PA MACMI/MACMT/12, the content of isophthalic acid is preferably equal to the content of terephthalic acid and/or the content of laurin lactam is preferably 15 to 40 mol %, and particularly preferably 20 to 30 mol %, and most particularly preferably the mol ratio of the repeating units MACMI/MACMT/12 is 38/38/24, wherein the sum of the molar fractions of all monomers is 100 mol %.

In the amorphous PA MACMI/MACMT/MAMC12, the content of isophthalic acid is preferably equal to the content of terephthalic acid and/or the content of dodecanedioic acid is preferably 30 to 60 mol %, and particularly preferably 40 to 50 mol %, and most particularly preferably the mol ratio of the repeating units MACMI/MACMT/MACM12 is 27/27/46, wherein the sum of the molar fractions of all monomers is 100 mol %.

In the amorphous PA 6I/6T/MACMI/MACMT/12, the content of isophthalic acid is preferably equal to the content of terephthalic acid and/or the content of laurin lactam is preferably 1 to 25 mol %, and particularly preferably 2 to 15 mol %, and most particularly preferably the mol ratio of the repeating units 6I/6T/MACMI/MACMT/12 is 34/34/14/ 14/4 or 39/39/9.6/9.6/2.8, wherein the sum of the molar fractions of all monomers is 100 mol %.

In the polyamides PA MACM10/PACM10, PA MACM12/ PACM12, PA MACM14/PACM14, PA MACM16/PACM16, PA MACM18/PACM18, the content of PACM is preferably 1 to 35 mol %, and particularly preferably 2 to 25 mol %, wherein the sum of the molar fractions of all monomers is 100 mol %. The polyamides PA MACM10/PACM10, PA MACM12/PACM12 or PA MACM14/PACM14 PA MACM16/PACM16, PA MACM18/PACM18 comprising a maximum of mol % PACM are amorphous.

In the amorphous PA 6I/6T/MACMI/MACMT/PACMI/ PACMT/12, the content of isophthalic acid is preferably equal to the content of terephthalic acid and/or the content of laurin lactam is preferably 2 to 15 mol %, and particularly preferably 2 to 7 mol %, and/or the content of PACM is preferably 2 to 7 mol %, wherein the sum of the molar fractions of all monomers is 100 mol %.

In the amorphous polyamides PA MACMI/MACMT/ MACM12/MACM36, PA MACMI/MACMT/MACM14/ MACM36, the molar fraction of isophthalic acid is preferably at least equal to the molar fraction of terephthalic acid, and the content of isophthalic acid is is preferably 6 to 49.55 mol %, particularly preferably 7 to 43.5 mol %, and most particularly preferably 11.5 to 27 mol % and/or the content of terephthalic acid is preferably 0.1 to 24.775 mol %, particularly preferably 0.5 to 22 mol %, and most particularly preferably 11.5 to 19.25 mol %, and/or the content of 1,12-dodecanedioic acid or 1,14-tetradecanedioic acid is preferably 0.1 to 37.75 mol %, particularly preferably 5 to 35 mol %, and most particularly preferably 10 to 25.5 mol %, and/or the content of the dimeric fatty acid having 36 carbon atoms is preferably 0.25 to 10 mol %, particularly preferably 1 to 7.5 mol %, and most particularly preferably 1.5 to 4.4 mol %.

In the amorphous polyamides PA TMDCI/TMDCT/ TMDC12/TMDC36, PA TMDCI/TMDCT/ TMDC36, the molar fraction of isophthalic acid is preferably at least equal to the molar fraction of terephthalic acid, and the content of isophthalic acid is preferably 6 to 49.55 mol %, particularly preferably 7 to 43.5 mol %, and most particularly preferably 11.5 to 27 mol % and/or the content of terephthalic acid is preferably 0.1 to 24.775 mol %, particularly preferably 0.5 to 22 mol %, and most particularly preferably 11.5 to 19.25 mol %, and/or the content of 1,12-dodecanedioic acid or 1,14-tetradecanedioic acid is preferably 0.1 to 37.75 mol %, particularly preferably 5 to 35 mol %, and most particularly preferably 10 to 25.5 mol %, and/or the content of the dimeric fatty acid having 36 carbon atoms is preferably 0.25 to 10 mol %, particularly preferably 1 to 7.5 mol %, and most particularly preferably 1.5 to 4.4 mol %.

The relative viscosity of the amorphous or microcrystalline polyamide (B), determined on solutions of 0.5 g polyamide in 100 ml m-cresol according to ISO 307 (2013) at 20° C., is preferably 1.35 to 2.15, particularly preferably 1.40 to 2.00, and most particularly preferably 1.45 and 1.90.

Component (C)

The term fillers (C) encompasses fibrous or needle-shaped fillers, particulate fillers, and mixtures thereof.

The fillers can preferably be coated or surface-treated, that is, they may be provided with a suitable sizing or adhesion promoter system or be surface-activated in another manner. For this purpose, for example, it is possible to use systems based on urethanes, silanes, epoxies, polyamides, polyhydroxy ethers, acrylates, or combinations or mixtures thereof.

The sizing is or adhesion promoter systems can also include other auxiliary substances such as antistatic agents or lubricants.

The fibrous or needle-shaped fillers are preferably selected from the group consisting of glass fibers, carbon fibers, basalt fibers, boron fibers, slag fibers, metal fibers, whiskers, mineral fibers, wollastonite, aramide fibers, ground glass fibers, ground carbon fibers, ground mineral fibers, and mixtures thereof. The fibrous or needle-shaped fillers are particularly preferably selected from the group consisting of glass fibers, carbon fibers, basalt fibers, boron fibers, aramide fibers, and mixtures thereof. Most particularly preferably, glass fibers are exclusively used as fibrous or needle-shaped fillers.

In terms of the glass or carbon fibers, it is possible to use staple fibers or continuous filaments (rovings).

The cross-section of the glass or carbon fibers is circular (round), oval, elliptical, elliptical with constriction(s) (so-called cocoon fibers), angular or rectangular. Fibers having a non-circular cross-section, and in particular oval, elliptical, elliptical with constriction(s) (so-called cocoon fibers), angular or rectangular fibers, are also referred to as flat fibers. It is also possible to use mixtures of circular and non-circular fibers.

The appearance of the glass fibers can be elongated or spiral-shaped.

It is possible to use glass fibers made of all glass types, such as A-, C-, D-, E-, E-CR-, L-, LD-, M-, NE-, S-, R-, AR-glass, or arbitrary mixtures thereof. Preferred are glass fibers made of E-glass, S-glass or mixtures comprising E- and/or S-glass fibers.

The staple glass fibers have a fiber length of 1 to 50 mm, especially of 1 to 25 mm, preferably 1.5 to 20 mm, particularly preferably 2 to 12 mm, and most particularly preferably of 2 to 8 mm.

The glass fibers especially have a diameter of 5 to 20 μm, preferably of 5 to 15 μm, and particularly preferably of 6 to 12 μm.

If the glass fibers are used as continuous filaments (rovings) in a pultrusion process, these preferably have a diameter of no more than 20 μm, preferably of no more than 18 μm, and particularly preferably of 10 to 17 μm.

The carbon fibers especially have a diameter of 3 to 12 μm, preferably 4 to 10 μm, and particularly preferably 4 to 9 μm.

In the flat fibers, the aspect ratio, that is, the ratio of the major cross-sectional axis to the minor cross-sectional axis, is 1.5 to 8, preferably 2 to 6, particularly preferably 2.5 to 5, and most particularly preferably 3 to 4.

Among the flat fibers, flat glass fibers are particularly preferred.

The cross-sectional axes of the flat glass fibers are 3 to 40 μm long. The length of the minor cross-sectional axis is preferably 3 to 20 μm, particularly preferably 4 to 10μ, and the length of the major cross-sectional axis is 6 to 40 μm, particularly preferably 12 to 30 μm.

The particulate fillers are preferably selected from the group consisting of dolomite, silicates, quartz, talc, mica, kaolin, perlite, silica, precipitated or fumed silica, diatomaceous earth, titanium dioxide, magnesium carbonate, magnesium hydroxide, aluminum hydroxide, ground or precipitated calcium carbonate, chalk, lime, lime stone powder, slate powder, feldspar, barium carbonate, barium sulfate, synthetic phyllosilicates, natural phyllosilicates, permanent magnet or magnetizable metals or alloys, glass flakes, glass spheres, hollow glass spheres, hollow silica sphere fillers, and mixtures thereof. The particulate fillers are particularly preferably selected from the group consisting of silicates, quartz, talc, mica, kaolin, perlite, silica, precipitated or fumed silica, diatomaceous earth, titanium dioxide, magnesium carbonate, magnesium hydroxide, aluminum hydroxide, ground or precipitated calcium carbonate, chalk, lime, lime stone powder, slate powder, feldspar, barium carbonate, barium sulfate, synthetic phyllosilicates, natural phyllosilicates, glass flakes, glass spheres, hollow glass spheres, hollow silica sphere fillers, and mixtures thereof. The particulate fillers are most particularly preferably selected from the group consisting of silicates, talc, mica, kaolin, titanium dioxide, ground or precipitated calcium carbonate, chalk, lime stone powder, slate powder, synthetic phyllosilicates, natural phyllosilicates, glass flakes, glass spheres, hollow glass spheres, and mixtures thereof.

Preferably, at least one fibrous or needle-shaped filler, or a mixture of at least one fibrous or needle-shaped filler with at least one particulate filler, is used as the filler (component (C)) in the polyamide molding compound according to the invention.

When a mixture of at least one fibrous or needle-shaped filler with at least one particulate filler is used, the content of the particulate filler accounts for no more than half, preferably no more than a third, and particularly preferably no more than a quarter of the total amount of the filler.

Particularly preferably, fibrous or needle-shaped fillers are exclusively used as the filler in the polyamide molding compound according to the invention.

Component (D)

According to a preferred embodiment of the present invention, the at least one additive (D) is selected from the group consisting of inorganic and organic stabilizers, in particular antioxidants, antiozonants, light stabilizers, in particular UV stabilizers, UV absorbers or UV blockers, lubricants, dyes, tracers, pigments, carbon black, graphite, graphene, carbon nanotubes, photochromic agents, antistatic agents, release agents, anti-block additives, chain-extending additives, chain-shortening additives, optical brighteners, IR absorbers, NIR absorbers, and mixtures thereof.

Among the organic stabilizers, phenol compounds, phosphite compounds, phosphonite compounds, hindered amine-based stabilizers (HALS) or the mixtures thereof are particularly preferred.

The at least one additive can also be added in master batch form. A polyamide is preferably used as the base polymer of the master batch. This polyamide is preferably selected from the group consisting of PA 12, PA 1010, PA 1012, PA 1212, PA 6/12, PA 612, PA MACM12 and the mixtures thereof, or consists of the polyamide (A) and/or the polyamide (B) itself.

The base polymer of the master batch is most particularly preferably the polyamide (A) or polyamide (B) itself.

The present invention will be described in more detail based on the following embodiments and experiments, without limiting the invention to the shown specific embodiments.

Component (E)

According to a preferred embodiment of the present invention, the at least one further polymer (E) is selected from the group consisting of foreign polymers, impact modifiers, and mixtures thereof. The at least one further polymer (E) is particularly preferably selected from the group consisting of impact modifiers and mixtures thereof.

Measuring Methods

Relative Viscosity

The relative viscosity was determined according to ISO 307 (2007) at 20° C. For this purpose, 0.5 g polymer granules was weighed into 100 ml m-cresol, and the calculation of the relative viscosity (RV) according to RV=t/to was carried out based on Section 11 of the standard.

Glass Transition Temperature (Tg) and Melting Temperature

The determination was carried out according to ISO 11357-2 and -3 (2013) using granules having a water content of less than 0.1 wt. %.

The differential scanning calorimetry (DSC) was carried out for each of the two heating processes with a heating rate of 20 K/min. After the first heating process, the sample was quenched in dry ice. The melting point was determined during the second heating process.

The temperature at the peak maximum is specified as the melting temperature. The midpoint of the glass transition range, which is specified as the glass transition temperature (Tg), was ascertained according to the "half height" technique.

Change in Weight

The change in weight was determined on stored ISO tensile bars.

The change in weight of tensile bars stored only in water is subtracted from the change in weight of the tensile bars stored in the aqueous hypochlorite solution. With this, the increase in weight, due to water absorption, which likewise occurs during the storage in aqueous hypochlorite solutions was eliminated.

Tensile Force

The tensile force was determined on ISO tensile bars (Type A1, mass 170×20/10×4) stored is in aqueous hypochlorite solution, produced according to the standard: ISO/CD 3167 (2003).

The measurement was carried out analogously to the measurement of the tensile strength according to ISO 527 (2012) at 23° C. using a pulling speed of 50 mm/min for unreinforced materials, and 5 mm/min for reinforced materials. The absolute force was used directly as the measurement value, that is, without division by the cross-sectional surface of the test specimen.

Light Transmission

The light transmission was ascertained at 23° C. according to ASTM D 1003-13 (2013) on 60×60 mm plates (width×length) having a thickness of 2 mm and film gate on a "Haze Gard plus" from Byk Gardner with CIE illuminant C. The light transmission value was specified in % of the irradiated light quantity.

Storage Conditions

The sampling was carried out at the same points in time for both storage types, specifically in each case after 1344 h, 4032 h, 5376 h, 6720 h, and 8064 h. For each material and storage time, 5 ISO tensile bars (Type A1, mass 170×20/1.0×4, produced according to standard: ISO/CD 3167 (2003)) were stored, and the arithmetic mean of the 5 measurement values was found.

The water storage was carried out at a thermostat-controlled 60° C. in deionized water.

The hypochlorite storage was carried out at a thermostat-controlled 60° C. in an aqueous sodium-hypochlorite solution having a concentration of 10 mg/L in a test stand from HyperDES-watertechnology GmbH, Crailsheim, Germany, having a volume of 100 L. The sodium-hypochlorite solution is circulated therein at 6 to 8 L/min, wherein the solution is set to a pH of 6.8 and conductivity of 600 to 1200 µS. The sodium-hypochlorite concentration, the pH, and conductivity are automatically regulated during the entire storage duration through the addition of 0.5 wt. % sodium-hypochlorite solution, 0.7 wt. % sodium hydroxide solution, 0.7 wt. % sulfuric acid or deionized water. The pH and the sodium-hypochlorite concentration are additionally checked once a week using the CHEMATEST 20s (available from Swan Analytische Instrumente AG, Hinwil, Switzerland) by means of colorimetric methods using N-N-diethyl-1,4-phenylenediamine according to DIN EN ISO 7393-2 (2012).

Production of the Test Specimens

Granules having a water content of less than 0.1 wt. % were used to produce the test specimens.

The ISO tensile bars were produced on an injection molding machine from Arburg, model Allrounder 420 C 1000-250. Cylinder temperatures that increase and decrease from the feed to the nozzle were used.

EXAMPLE 1 AND COMPARISON EXAMPLE 2

Cylinder temperatures: 310/315/320/325/330/325° C.
Mold temperature: 120° C.

EXAMPLES 3, 4 AND COMPARISON EXAMPLE 5

Cylinder temperatures: 320/325/330/335/340/330° C.
Mold temperature: 140° C.

EXAMPLES 6, 7 AND 8

Cylinder temperatures: 290/295/300/305/310/300° C.
Mold temperature: 80° C.

Unless indicated otherwise, the test specimens were used in a dry state; for this purpose, they were stored, after the injection molding process, for at least 48 hours at room temperature in a dry environment, that is, over silica gel.

TABLE 1

Materials used in the examples and comparison examples

| Components | Description | Manufacturer |
|---|---|---|
| Polyamide (A1) 10T/6T | Semi-crystalline polyamide made of 1,10-decanediamine (41 mol %), 1,6-hexanediamine (9 mol %) and terephthalic acid (50 mol %) Relative viscosity* 1.63 Melting temperature 295° C. | EMS-CHEMIE AG, Switzerland |

TABLE 1-continued

Materials used in the examples and comparison examples

| Components | Description | Manufacturer |
|---|---|---|
| Polyamide (A2) 6T/6I | Semi-crystalline polyamide made of 1,6-hexanediamine (50 mol %), terephthalic acid (35 mol %) and isophthalic acid (15 mol %) Relative viscosity* 1.62 (measured with 0.5 g in 100 ml m-cresol at 20° C.) Melting temperature 325° C. | EMS-CHEMIE AG, Switzerland |
| Polyamide 12 (A3) | Semi-crystalline polyamide 12 made of laurin lactam Relative viscosity* 1.58 Melting temperature 178° C. | EMS-CHEMIE AG, Switzerland |
| Polyamide (B1) MACMI/ MACM T/12 | Amorphous polyamide made of Bis(4-amino-3-methylcyclohexyl) methane (38.0 mol %), isophthalic acid (19.0 mol %), terephthalic acid (19.0 mol %), and laurin lactam (24.0 mol %) Relative viscosity* 1.56 Glass transition temperature 194° C. Light transmission 93% | EMS-CHEMIE AG Switzerland |
| Polyamide (B2) MACMI/12 | Amorphous polyamide made of Bis(4-amino-3-methylcyclohexyl) methane (32.5 mol %), isophthalic acid(32.5 mol %), and laurin lactam (35 mol %) Relative viscosity* 1.56 (measured with 0.5 g in 100 ml m-cresol at 20° C.) Glass transition temperature 160° C. Light transmission 94% | EMS-CHEMIE AG Switzerland |
| Glass fibers | Round glass fibers, 3 mm long Diameter 10 μm Trade name: CPIC ECT 301HP | Chongqing Polycomp International Corp., China |
| Stabilizer | Pentaerythritol tetrakis-[3-(3,5-di-tert-butyl-4-hydroxyphenyl)propionate, antioxidant based on a sterically hindered phenol CAS: 6683-19-8 Trade name: Irganox 1010 | BASF SE, Germany |

*Relative viscosity, measured using a solution of 0.5 g polyamide in 100 ml m-cresol at 20° C.

TABLE 2

Test results—change in weight in %

| | Unit | Example 1 | Comparison Example 2 | Examples 3 | 4 | Comparison Example 5 | Examples 6 | 7 | 8 |
|---|---|---|---|---|---|---|---|---|---|
| Polyamide (A1) 10T/6T | % by weight | 29.75 | 49.75 | — | — | — | — | — | — |
| Polyamide (A2) 6T/6I | % by weight | — | — | 29.75 | 45 | 59.75 | — | — | — |
| Polyamide 12 (A3) | % by weight | — | — | — | — | — | 19.75 | 24.75 | 29.75 |
| Polyamide (B1) MACMI/MACMT/12 | % by weight | 20 | — | — | — | — | 30 | 25 | 20 |
| Polyamide (B2) MACMI/12 | % by weight | — | — | 30 | 15 | — | — | — | — |
| Glass fibers | % by weight | 50 | 50 | 40 | 40 | 40 | 50 | 50 | 50 |
| Stabilizer | % by weight | 0.25 | 0.25 | 0.25 | 0.25 | 0.25 | 0.25 | 0.25 | 0.25 |
| Storage duration [h] | | | | | | | | | |
| 0 | % | 0 | 0 | 0 | 0 | 0 | 0 | 0 | 0 |
| 1344 | % | −0.17 | −1.97 | −0.28 | −0.63 | −0.79 | −0.16 | −0.21 | −0.33 |
| 2688 | % | −0.48 | −5.41 | 0.74 | −1.03 | −2.42 | 0.14 | −0.64 | −1.33 |
| 4032 | % | −2.25 | −7.84 | −2.96 | −2.81 | −4.13 | −1.03 | −1.22 | −2.61 |
| 5376 | % | −3.74 | −11.15 | −3.84 | −4.25 | n.m. | −1.94 | −2.50 | −4.78 |
| 6720 | % | −4.86 | −13.43 | −5.41 | −6.14 | −11.99 | −2.62 | −2.93 | −6.89 |
| 8064 | % | −5.81 | −15.89 | −6.26 | −7.61 | −14.05 | −3.05 | −3.69 | −8.03 | n.m. not measured

TABLE 3

Test results—tensile force in N and in % of the initial value

| | Unit | Example 1 | Comparison Example 2 | Examples 3 | | 4 | Comparison Example 5 | Examples 6 | | 7 | | 8 | |
|---|---|---|---|---|---|---|---|---|---|---|---|---|---|
| Polyamide (A1) 10T/6T | % by weight | 29.75 | 49.75 | — | | — | — | — | | — | | — | |
| Polyamide (A2) 6T/6I | % by weight | — | — | 29.75 | | 45 | 59.75 | — | | — | | — | |
| Polyamide 12 (A3) | % by weight | — | — | — | | — | — | 19.75 | | 24.75 | | 29.75 | |
| Polyamide (B1) MACMI/MACMT/12 | % by weight | 20 | — | — | | — | — | 30 | | 25 | | 20 | |
| Polyamide (B2) MACMI/12 | % by weight | — | — | 30 | | 15 | — | — | | — | | — | |
| Glass fibers | % by weight | 50 | 50 | 40 | | 40 | 40 | 50 | | 50 | | 50 | |
| Stabilizer | % by weight | 0.25 | 0.25 | 0.25 | | 0.25 | 0.25 | 0.25 | | 0.25 | | 0.25 | |

| Storage duration [h] | — | N | % | N | % | N | % | N | % | N | % | N | % | N | % | N | % |
|---|---|---|---|---|---|---|---|---|---|---|---|---|---|---|---|---|---|
| 0 | — | 8914 | 100 | 8352 | 100 | 7665 | 100 | 8063 | 100 | 9731 | 100 | 7326 | 100 | 7355 | 100 | 7162 | 100 |
| 1344 | — | 7482 | 84 | 6573 | 79 | 6330 | 83 | 6667 | 83 | 8059 | 83 | 6425 | 88 | 6541 | 89 | 6346 | 89 |
| 2688 | — | 7341 | 82 | 6096 | 73 | 6276 | 82 | 6428 | 80 | 7628 | 78 | 6571 | 90 | 6527 | 89 | 6456 | 90 |
| 4032 | — | 7261 | 81 | 5831 | 70 | 6106 | 80 | 6327 | 78 | 7432 | 76 | 6454 | 88 | 6521 | 89 | 6060 | 85 |
| 5376 | — | 7095 | 80 | 5598 | 67 | 6046 | 79 | 6275 | 78 | n.m. | n.m. | 6563 | 90 | 6530 | 89 | 6127 | 86 |
| 6720 | — | 7153 | 80 | 5330 | 64 | 5953 | 78 | 6276 | 78 | 6807 | 70 | 6518 | 89 | 6345 | 86 | 6060 | 85 |
| 8064 | — | 7006 | 79 | 4904 | 59 | 5981 | 78 | 6060 | 75 | 6543 | 67 | 6418 | 88 | 6388 | 87 | 5759 | 80 | n.m.—not measured

As is apparent from the experiments, it is surprisingly found that only the polyamide molding compounds comprising mixtures of semi-crystalline polyamide (A) and amorphous polyamide (B) (Examples 1, 3, 4 and 6 to 8) are stable with respect to hypochlorite lye.

Surprisingly, it was found that, during the storage of a molded body in a hypochlorite-containing aqueous solution, a considerably lower loss of weight occurs in the polyamide molding compounds comprising mixtures of semi-crystalline polyamide (A) and amorphous polyamide (B) than in the polyamide molding compounds comprising only semi-crystalline polyamide (A) (Comparison Examples 2 and 5) (Table 2). The decrease in weight gives rise to the assumption of oxidative degradation of, and consequently damage to, the polyamide molding compound. This damage is thus considerably lower in the polyamide molding compounds of the examples according to the invention than in the polyamide molding compounds of the comparison examples.

This finding is confirmed by the measurement of the tensile force after contact with hypochlorite-containing solutions (Table 3). Upon contact with hypochlorite-containing is solutions, polyamide molding compounds comprising mixtures of semi-crystalline polyamide (A) and amorphous polyamide (B) (Examples 1, 3, 4 and 6 to 3) show considerably better resistance in terms of the tensile force than polyamide molding compounds comprising only semi-crystalline polyamide (A) (Comparison Examples 2 and 5).

The invention claimed is:

1. A molded body that is resistant to an aqueous solution comprising hypochlorous acid and/or a salt thereof, comprising:
    at least one semi-crystalline polyamide (A) selected from the group consisting of PA MXD6, PA MXD10, PA 6T/6I, PA 9T/MODT wherein MOD stands for 2-methyl-1,8-octanediamine, PA 10T, PA 10T/6T, PA 10T/6T/10I/6I, PA 12T, PA 10T/10I, PA 6T/6, PA 6T/66, PA 10T/6T/1012/612, PA 6T/BACT, PA 66/BAC6/MACM6, PA 66/BAC6/PACM6, PA 66/BAC6/IPD6 and copolymers thereof and
    at least one amorphous or microcrystalline polyamide (B) selected from the group consisting of PA MACMI/MACM12, PA MACMT/MACM12, PA 6I/MACMI/12, PA MACMT/MACM36, PA MACMI/MACMT/MACM36, PA 6I/6T/MACMI/MACMT, PA 6I/6T/MACMI/MACMT/MACM12/612, PA 6I/6T/MACMI/MACMT/MACM12, PA MACMI/MACMT/MACM12/12, PA MACMI/MACMT/MACM12, PA MACMI/MACMT/MACM12/MACM36, PA MXDI/6I, PA MXDI/MXD6, PA MACM36, PA MACM10/1010, PA MACM14/1014, and copolymers thereof,
    wherein, when MACM accounts for up to 35 mol % of all monomers before replacement, MACM can be partially or fully replaced by PACM and/or TMDC, keeping the sum of the molar fractions of all monomers at 100 mol %, or when MACM accounts for more than 35 mol % of all monomers before replacement, MACM can be replaced by PACM and/or TMDC such that the replaced amount of MACM does not exceed 35 mol %, keeping the sum of the molar fractions of all monomers at 100 mol %, and/or
    laurin lactam can be replaced entirely or partially with caprolactam, and/or
    the dimeric fatty acid having 36 carbon atoms can be replaced entirely or partially with a dimeric fatty acid having 44 carbon atoms,
    and
    optionally at least one further compound selected from the group consisting of inorganic filler (C), one or more additives (D) selected from the group consisting of inorganic and organic stabilizers, lubricants, dyes, marking agents, pigments, carbon black, graphite, graphene, carbon nanotubes, photochromic agents, antistatic agents, release agents, anti-block additives, chain-extending additives, chain-shortening additives, optical brighteners, IR absorbers, and NIR absorbers, and a polymer (E) which is different from polyamide (A), polyamide (B), and additive (D).

2. The molded body to claim 1, which is selected from the group consisting of components for the delivery and/or storage of drinking water or warm water, faucets, fittings, housings, mixers, taps, filter housings, water meters, water meter components, valves, valve components, water distributors, cartridges, pumps, pump components, viewing glasses, covers, water lines, and receptacles.

3. The molded body according to claim 1, wherein the at least one amorphous or microcrystalline polyamide (B) has a glass transition temperature, measured according to ISO 11537-2 (2013), of 60 to 240° C.

4. The molded body according to claim 1, wherein the polyamide molding compound additionally comprises at least one of the following components selected from the group consisting of an inorganic filler (C), an additive (D), and a further polymer (E) that is different from polyamide (A), polyamide (B), and additive (D).

5. The molded body according to claim 1, wherein the polyamide molding compound comprises at least one inorganic filler (C) selected from the group consisting of fibrous fillers and needle-shaped fillers.

6. The molded body according to claim 1, wherein the polyamide molding compound comprises at least one inorganic filler (C) selected from the group consisting of glass fibers and carbon fibers.

7. The molded body according to claim 1, wherein the polyamide molding compound has the following composition:
19 to 95 wt. % of at least one semi-crystalline polyamide (A);
5 to 60 wt. % of at least one amorphous or microcrystalline polyamide (B);
0 to 70 wt. % of at least one inorganic filler (C);
0 to 6 wt. % at least one additive (D); and
0 to 20 wt. % of at least one polymer (E),
components (A) to (E) adding up to 100 wt. %.

8. The molded body according to claim 7, wherein the polyamide molding compound has the following composition:
to 89.39 wt. % of at least one semi-crystalline polyamide (A);
to 50 wt. % of at least one amorphous or microcrystalline polyamide (B);
0.1 to 60 wt. % of at least one inorganic filler (C);
0.01 to 5 wt. % of at least one additive (D); and
0.5 to 15 wt. % of at least one polymer (E),
components (A) to (E) adding up to 100 wt. %.

9. The molded body according to claim 1, wherein the polyamide molding compound comprises at least one inorganic filler (C) and at least one additive (D).

10. The molded body according to claim 9, wherein the polyamide molding compound has the following composition:
19 to 95 wt. % of at least one semi-crystalline polyamide (A);
to 60 wt. % of at least one amorphous or microcrystalline polyamide (B);
0.1 to 70 wt. % of at least one inorganic filler (C); and
0.01 to 6 wt. % of at least one additive (D),
components (A) to (D) adding up to 100 wt. %.

11. The molded body according to claim 1, wherein semi-crystalline polyamide (A) is selected from the group consisting of PA MXD6, PA MXD10, PA 9T/MODT wherein MOD stands for 2-methyl-1,8-octanediamine, PA 10T, PA 10T/6T, PA 10T/6T/101161, PA 12T, PA 10T/10I, PA 6T/6, PA 6T/66, PA 10T/6T/1012/612, PA 6T/BACT, PA 66/BAC6/MACM6, PA 66/BAC6/PACM6, PA 66/BAC6/IPD6, and copolymers thereof.

12. The molded body according to claim 1, wherein the one or more additives (D) are selected from the group consisting of UV stabilizers, UV absorbers, UV blockers, lubricants, dyes, carbon black, graphite, graphene, carbon nanotubes, photochromic agents, antistatic agents, release agents, anti-block additives, chain-extending additives, chain-shortening additives, optical brighteners, IR absorbers, and NIR absorbers.

13. The molded body according to claim 1, wherein the inorganic fillers (C) are selected from the group consisting of basalt fibers, boron fibers, slag fibers, metal fibers, wollastonite, aramide fibers, and combinations thereof.

* * * * *